United States Patent [19]

Materne et al.

[11] Patent Number: 5,331,257
[45] Date of Patent: Jul. 19, 1994

[54] COMMUTATED ELECTRO-DYNAMIC MACHINE SUCH AS A D.C. MOTOR, HAVING AN AUTO-SYNCHRONIZING SENSOR, AND A SCREEN WIPING APPARATUS EMPLOYING SUCH A MOTOR

[75] Inventors: Xavier Materne, Billere; Richard Dazat, Chatillon, both of France

[73] Assignee: Valeo Systemes d'Essuyage, Montigny-le-Bretonneux, France

[21] Appl. No.: 986,144

[22] Filed: Dec. 4, 1992

[30] Foreign Application Priority Data

Dec. 6, 1991 [FR] France .................. 91 15162

[51] Int. Cl.⁵ ............................................. H02K 23/00
[52] U.S. Cl. ...................................... 318/85; 318/70; 318/146; 318/254
[58] Field of Search ............... 318/70, 254, 146, 85

[56] References Cited

U.S. PATENT DOCUMENTS

| | | | |
|---|---|---|---|
| 3,569,804 | 3/1971 | Studer | 318/254 |
| 3,577,050 | 5/1971 | Ringland et al. | 318/146 |
| 3,663,877 | 5/1972 | Clark | 318/254 |
| 5,177,393 | 1/1993 | Webber | 318/254 |

Primary Examiner—William M. Shoop, Jr.
Assistant Examiner—Karen Masih
Attorney, Agent, or Firm—Morgan & Finnegan

[57] ABSTRACT

In a screen wiping apparatus for a vehicle, two or more motorsz of the kind having a commutator, such as d.c. wiper motors, are automatically synchronised by a synchronising means which comprises a wheel coupled to the commutator of each machine, together with a reading device which is coupled to the stator of the machine. The reading device detects the instantaneous angular position of the machine.

15 Claims, 6 Drawing Sheets

COMMUTATED ELECTRO-DYNAMIC MACHINE SUCH AS A D.C. MOTOR, HAVING AN AUTO-SYNCHRONIZING SENSOR, AND A SCREEN WIPING APPARATUS EMPLOYING SUCH A MOTOR

FIELD OF THE INVENTION

The present invention relates to an electro-dynamic machine of the kind having a commutator together with an auto-synchronising sensor. More particularly, it is concerned with a d.c. motor having a commutator. In addition, the invention relates to a vehicle screen wiping apparatus which employs at least one such motor.

BACKGROUND OF THE INVENTION

In the prior art, systems are already known which enable at least two electro-dynamic machines to operate in a synchronised manner. In particular, when the electro-dynamic machine is a motor, the synchronisation operates so that at least two motors work at the same time or with the same electro-mechanical characteristics, e.g. position, speed, power, or motor torque. In order to achieve this objective, efforts have been made to construct an auto-synchronising means (i.e. a means for obtaining automatic synchronisation) associated with each motor, such that a multi-motor mechanical system can be more easily and more effectively synchronised in its operation.

A particularly relevant application of such a system is that of vehicle screen wiping apparatus, e.g. for windshield wipers, in which most typically two wipers are driven in synchronised movement when a single motor is used. In current practice, it is necessary to drive the pivot axes of the two wipers by means of a linkage which is bulky, noisy, and costly both in price and in energy.

DISCUSSION OF THE INVENTION

One object of the present invention is to propose a means which enables the problem mentioned above to be overcome, and in which the automatic synchronising means comprises a sensor for sensing the angular position of the rotor of the motor.

In the prior art, electric motors without commutators (i.e. without mechanical commutators) have been proposed, in which the motor is provided with position sensors for the rotor, especially for the purpose of supplying a control signal to a control circuit. In response to this control signal, the control circuit produces control signals which are transmitted to switching elements arranged in the electrical supply circuit for energising the various phases or windings of the stator of the motor. In such motors, for example those having electronic commutation, the question of automatic synchronisation does not occur in the same terms.

The use of a motor having a commutator, such as an ordinary d.c. motor, is attractive as regards both cost and simplicity. However, the fact that it is difficult to incorporate, in such a motor, any means that enable the rotational or angular position of its rotor to be recognised is a barrier to any resolution of the technical problems of automatic synchronisation.

The electro-dynamic machine of the present invention may also be in the form of a generator, or may be a reversible machine, i.e. one in which its first operating mode is that of a motor, while in a second operating mode it acts as a generator.

A further object of the present invention is to provide an improvement over the prior art by resolving the problem of positioning active parts of the sensor which is part of the automatic synchronising means.

Another object of the invention, in order to reduce manufacturing costs of an electro-dynamic machine having a commutator, is to enable the automatic synchronising means to be integrated with the commutator and with the remainder of the service elements of the machine, all within the same casing.

Yet another object of the invention is to enable an integral machine to be manufactured.

Still a further object of the invention, in order to achieve a high degree of integration of the functions of the machine, is to integrate the functions of the automatic synchronisation sensor with respect to electrical supply and generation of signals with the service elements of the machine to the maximum possible extent.

Accordingly, the present invention is concerned generally with an electro-dynamic machine having a rotating commutator and with a rotor mounted inside a stator, for example a direct current motor, having an automatic synchronising means. Such a machine, according to the invention, is characterised in that the automatic synchronising means includes: a wheel, coupled to the commutator and having at least one portion which carries an indication of a recorded annular position; and at least one reading device for the said position indication, the reading device being coupled to the stator of the machine.

The invention is also concerned with a synchronised screen wiping system that includes two wiping zones arranged for synchronised wiping by means of screen wipers, the ends of the latter being driven by a motor which is synchronised by means of a control circuit, with each of the motors being provided with a connector which is connected to a control circuit through connecting cables, the control circuit being arranged to receive electrical energy from a battery and receiving command signals for the wiping operation from a command unit via a connecting cable.

Further features and advantages of the present invention will become apparent on a reading of the detailed description of preferred embodiments of the invention which follows, and which is given by way of example only and with reference to the accompanying drawings.

DESCRIPTION OF PREFERRED EMBODIMENTS OF THE INVENTION

Figure 1:
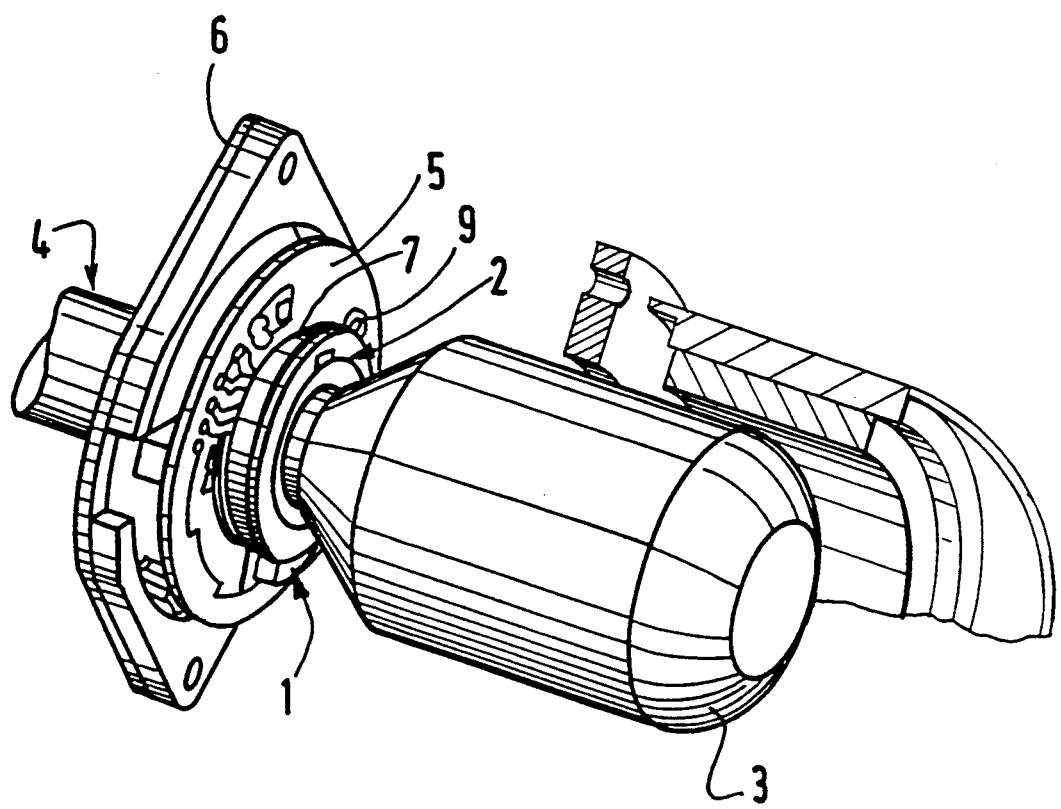
FIG. 1 is a simplified general view of a rotor mounted on an end plate of a machine in accordance with the invention.

FIG. 1 is a perspective view of a rotor which is equipped with a wheel according to the invention. The rotor includes an armature winding 3 and a commutator 7 mounted on a rotatable shaft 4.

The commutator 7 passes through a hole which is formed through a printed circuit 5 that supports the electrical service circuit which will be described later on herein. The printed circuit 5 is mounted on support feet (not shown), which are mounted on the inner face of an end plate or intermediate member 6. The latter serves for closing the casing (not shown) of the machine, and to secure it to a support or to another working component such as a speed reducing gearbox.

A wheel 2, on which an angular position indicator 9 is carried, is mounted at one end of the commutator 7. The indication given by the indicator 9 may be obtained in particular, either by inscription of an optically readable mark, or by loading it with an item of magnetic data. In one version, this indication consists of a single indication or mark. A reading device 1, for reading the indication 9 which is inscribed or loaded on the wheel 2, is mounted on the printed circuit 5. The nature of the reading device 1 depends on the nature of the indication (i.e. whether it is magnetic, optical, or of some other form).

In one preferred embodiment of the invention, the indication is magnetic in character. The reading device accordingly comprises a Hall effect sensor, the output voltage of which is modulated as a function of the variations in flux generated by the magnetic indication. It is thus possible to obtain a reading signal at the output of the reading device 1 which has a first value (for example a maximum) when the indication 9 is physically closest to the reading device, and a second value (which may for example be a minimum value) when the indication is remote from the reading device, for example diametrically opposed to it.

In one embodiment of the invention, the wheel 2 is a multi-polar wheel. The multi-polar wheel 2 comprises a succession of alternate north and south poles, disposed around the periphery of the wheel. Accordingly, a reading signal at the output of the reading device displays a variation which depends on the number of poles, this number being such that the degree of precision with which the instantaneous angular position of the rotor is detected can be defined.

In one embodiment, the multi-polar wheel 2 comprises a ring of anisotropic magnetic material which is magnetised by a magnetising machine that confers on it a succession of north and south polarities alternating with each other over the whole of its perimeter. In another embodiment, the multi-polar wheel includes a cylindrical body of non-magnetic material, on the outer surface of which a plurality of recesses are formed. A number of bars, of a suitably polarised magnetic material, are fitted in these recesses.

Figure 2:
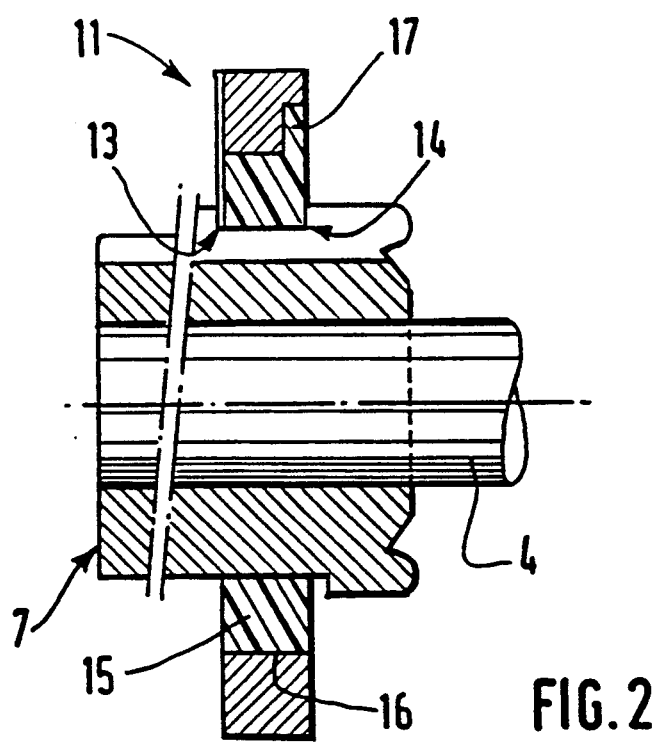
FIG. 2 is a view in cross section showing how the wheel, coupled to the commutator, is attached.

FIG. 2 shows one embodiment of the multi-polar wheel, though it should be observed that the latter may be replaced by any other wheel carrying a suitable indication. The multi-polar wheel, here indicated by the reference numeral 11, is carried on the periphery of the commutator 7. A set of grooves are disposed at predetermined angular intervals on the commutator 7, at the level of fastening means indicated at 13 and 14. These fastening means secure the wheel 11 on the cylinder which is constituted by the commutator 7, and are known per se. A fastening element of the wheel 11 is received in these grooves. In one embodiment, such a fastening element is in the form of a mortice formed on a radial spacer 15, the periphery 16 of which carries tongues 17 which secure the wheel 11 against rotation with respect to the spacer 15.

Figure 3:
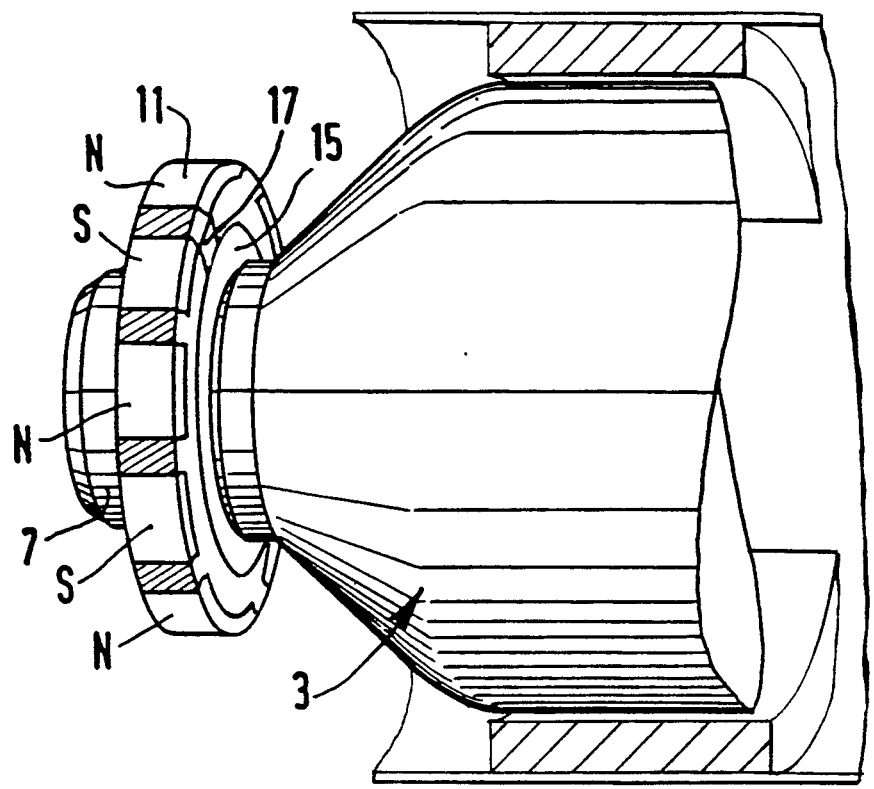
FIG. 3 is a general view of the rotor with the wheel coupled to the commutator.

FIG. 3 is a partial perspective view which incorporates the arrangement shown in FIG. 2. The same references are applied to the same elements as in FIG. 2, which will not be described any further. FIG. 3 clearly shows the structure, in which a succession of magnetic north and south poles are arranged on a cylindrical ring.

Figure 4:
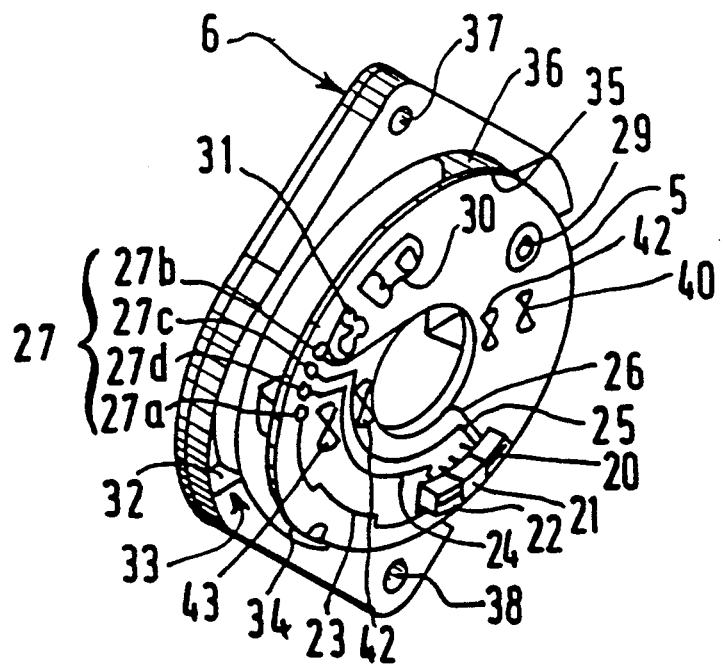
FIG. 4 shows a detail of the fastening of the reading device in a machine according to the invention.

FIG. 4 is a view of the intermediate member 6, with the printed circuit 5 attached to it. In the lower part of the Figure, the printed circuit 5 carries two Hall effect sensors 20 and 22, which are spaced apart by an angular interval which is for example 10 degrees. The two sensors 20 and 22 are inserted in recesses formed in a sensor support member 21, so that they can be secured mechanically and oriented with respect to the rotating part, e.g. the wheel 2, which carries the magnetic indication or mark as discussed above. Such Hall effect sensors comprise a body made of a semiconducting material, one face of which must be disposed parallel to the variation in the flux to be detected. This face is of course the Hall effect detection face. Each sensor has three electrical terminal tags, one for positive polarisation, one for negative polarisation (i.e. connected to ground), and one for the detection signal.

The positive terminal tag of each sensor 20, 22 is connected to a contact strip 23 on the printed circuit 5. This strip 23 leads into a conductive zone 27a of the printed circuit 5, on to which a traverse element (not shown) is soldered. The traverse element comprises a suitable elongated conductive body such as a wiping finger. It constitutes an element on to which a corresponding wire of electrical supply cable of the machine can be soldered during assembly of the motor.

Similarly, the negative terminal tag of each sensor is connected to another contact strip 26 on the printed circuit 5. This strip 26 leads into a second conductive zone 27b of the printed circuit 5, on to which a further traverse element (again not shown) is soldered. This traverse element again comprises an elongated conductive body such as a wiping element, and again, during assembly of the motor, a corresponding wire of the electrical supply cable for the machine can be soldered to it.

The third terminal tag, for carrying the detection signal of each of the Hall effect sensors 20, 22, is connected to a respective one of two further conductive strips 24 and 25 of the printed circuit. In one embodiment, these two conductive strips 24 and 25 are connected respectively to conductive zones 27c and 27d respectively on the printed circuit. Further traverse elements, connected to corresponding wires of the power supply cable for the motor, are arranged on these conductive zones 27c and 27d. Accordingly, the machine is able to be controlled and operated from outside, due to the detection signals transmitted by the two Hall effect sensors.

The assembly consisting of the conductive zones 27a, 27b, 27c and 27d, together with the traverse elements mentioned above, constitutes one part of a terminal block 27. In one embodiment, this terminal block is the first part, for example the male part, of a connector. The second part of this connector is fitted on the end of the electrical connecting cable of the machine.

In another embodiment, the printed circuit carries components (not shown in the drawings) which enable the output signals from the sensors 20 and 22 to be processed in the electrical service circuit 5 itself. For example, the service circuit 5 may perform the function of interface between the electronic processing means and the machine.

The electrical supply for the machine is obtained by way of carbon brushes and the connecting cable, which also includes wires for connection to the windings of the machine (not shown). These windings are connected to conductive zones 30 and 31 respectively, to which are soldered the tails (not shown) of the wires in the stator windings—if indeed the stator is a wound stator—and/or the wires for connection to the brushes engaging on the commutator of the machine for supplying the machine.

The intermediate member 6 includes fastening ears through which holes 37 and 38 are formed for fastening the member 6 to a plate of the body or casing (not shown) of the machine. The electric service circuit 5 is mounted in the interior of the intermediate member 6, within a recess which is defined by a peripheral flange 33. This recess is open towards the interior of the machine when the intermediate member is mounted on the casing. The intermediate member 6 carries legs or fastening lugs 34 and 36 for the printed circuit on which the electrical service circuit 5 is formed (see FIG. 5).

Figure 5:
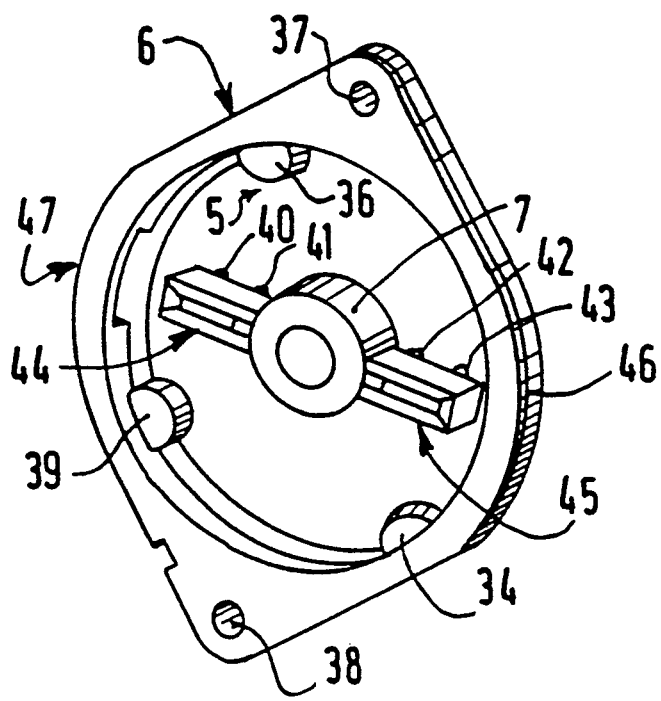
FIG. 5 shows a detail of one component of the machine of FIG. 4, which enables an integral machine to be made in accordance with the invention.
Figure 7:
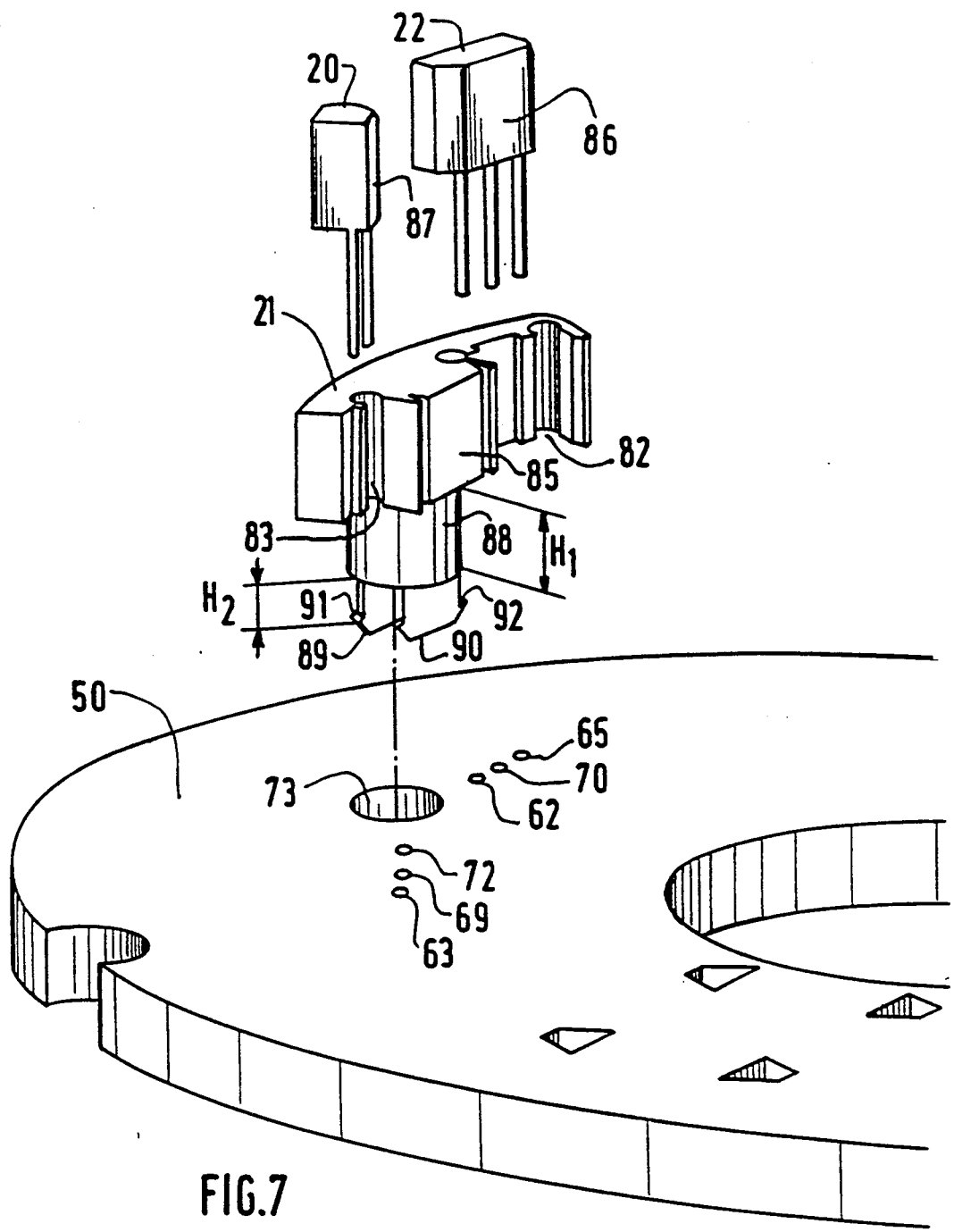
FIG. 7 is an exploded perspective view illustrating one embodiment of a reading device in accordance with the invention, on a component of the machine shown in FIG. 6.

FIG. 5 shows a pair of brush holders 44 and 45, having fixing lugs 40, 41 and 42, 43 respectively which are inserted into corresponding holes in the printed circuit 5. These fixing lugs can also be seen on the other side of the printed circuit 5 in FIG. 4, being visible in FIG. 5 on the same side of the circuit 5 as the brush holders 44 and 45. FIG. 7, described below, is also relevant.

In FIG. 5 the same reference numerals are given to the same elements as in the preceding Figures. In FIG. 5 the commutator 7 extends through a hole formed in the printed circuit 5 and a corresponding hole in the base of the intermediate member 6. The latter is here shown as though fitted on to the motor casing, though the latter is not itself shown.

Figure 6:
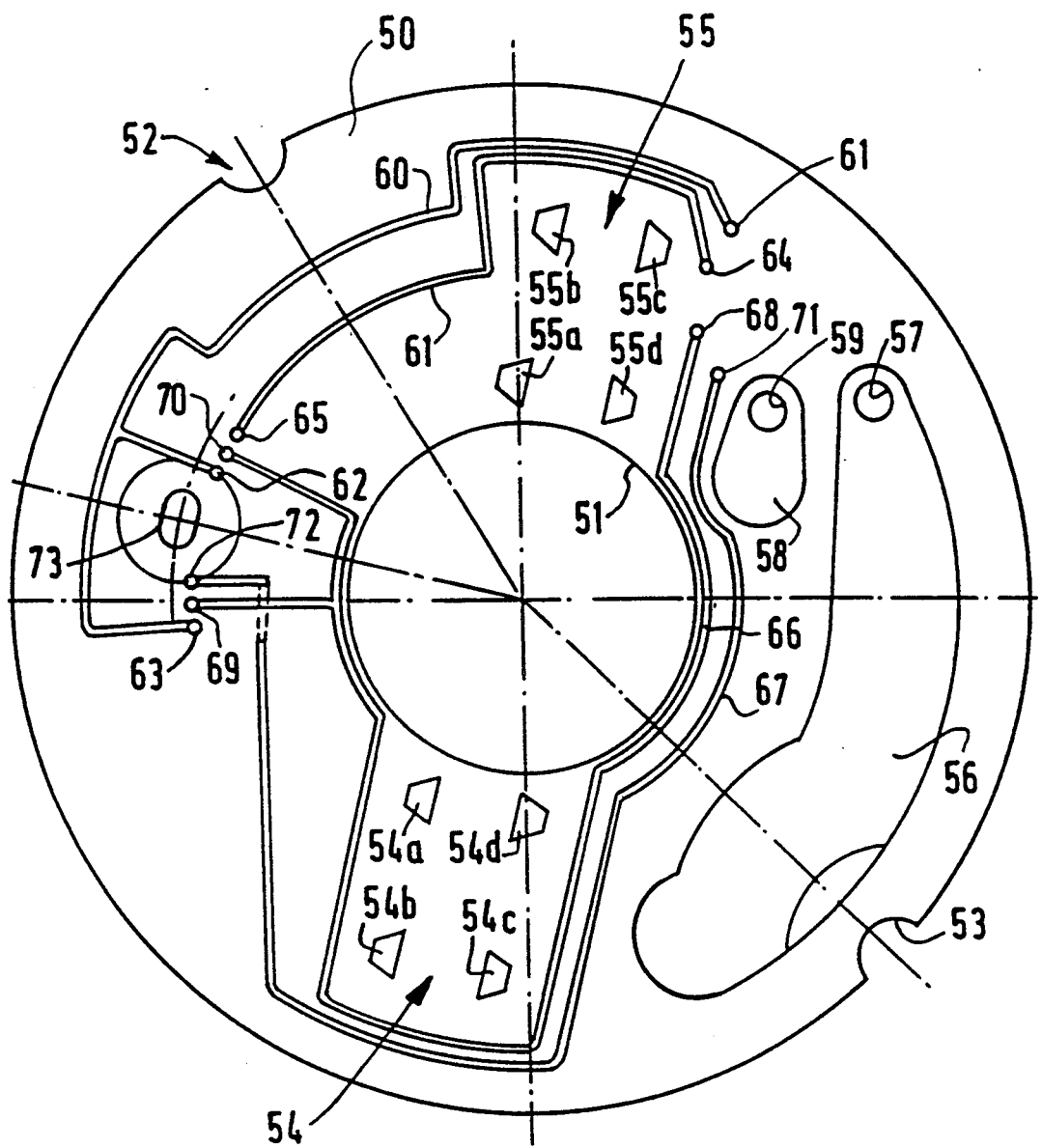
FIG. 6 is a top plan view of one component of the machine shown in FIG. 5.

FIG. 6 shows one embodiment of the printed circuit for attachment to the intermediate member 6 of FIG. 3. The printed circuit comprises an insulating substrate 50, generally circular in shape and having a central through hole 51 through which the shaft and commutator of the rotor are able to pass. The outer periphery of the substrate 50 is formed with two notches 52 and 53 for locating the brush carrier plate on the intermediate member 6. These notches are made using circular punches, and are offset from each other at such an angle that they are not symmetrical, so that during assembly, the printed circuit can be fitted in the motor in only one correct orientation.

In addition, the substrate, or support, 50 has two zones 54 and 55 which are pierced with trapezoidal fastening holes 54a to 54d and 55a to 55d respectively, which are adapted to receive the fixing lugs of the two brush carriers on the face of the printed circuit that is not visible in FIG. 6.

The substrate 50 carries a first conductive zone 56 of the motor power supply circuit. This conductive zone 56 has a through hole 57 through which one connecting pin is able to pass. The substrate 50 also carries a second conductive zone 58, which is arranged to receive a connector for connecting the power circuit to ground. This second conductive zone 58 has a further through hole 59 through which another connecting pin can pass. The conductive zones 56 and 58 correspond to the zones 30 and 31 in FIG. 4, and thus constitute the connecting means for the power supply to the motor.

The substrate 50 also carries a connecting strip 60 for the common connection of the Hall effect sensors to ground, and a further connecting strip 61 for carrying the detection signal from a first one of the Hall effect sensors. The ground connecting strip 60 connects a terminal connecting element 61 to two further terminal connecting elements 62 and 63. The first and second Hall effect sensors (not shown in FIG. 6) have their respective terminal pins for connection to ground engaged with the terminal elements 62 and 63 respectively. The conductive strip 61 is joined to further terminal connecting elements 64 and 65, the signal output pin of the first Hall effect sensor being soldered to the connecting element 65.

The substrate 50 also carries further conductive strips indicated at 66 and 67. The strip 67 supplies the Hall effect sensors with a positive voltage, while the strip 67 conveys the detection signal from the second Hall effect sensor. The strip 66 joins a terminal collecting element 68 to two further terminal collecting elements 69 and 70. The positive terminal pins of the two Hall effect sensors are secured respectively to the elements 69 and 70. As to the connecting strip 67, this joins a terminal collecting element 71 to a terminal collecting element 72 for engagement with the corresponding terminal pin of the second Hall effect sensor. The various terminal collecting elements 61, 64, 69 and 70 together correspond to the terminal block described above with reference to FIG. 4.

An oblong fixing hole 73, in which a fixing lug for the support member (21 in FIG. 4) for the two Hall effect sensors is attached by clipping, is formed in the insulating substrate between the group of terminal connecting elements 65, 70 and 62 for the first sensor, and the corresponding connecting elements 72, 69 and 63 for the second sensor.

Reference will now be made to FIG. 7, which illustrates how the Hall effect sensors are mounted on the printed circuit. Each sensor 20 or 22 is in the form of a capsule in the general form of a parallelepiped, with its three connecting pins projecting from its lower face. These pins penetrate into the holes 65, 70 and 62 for one sensor, and 72, 69 and 63 for the other sensor. As will be realised from the description above with reference to FIG. 6, these holes are the respective terminal connecting elements. Before the pins are inserted into these holes, the two sensors 20 and 22 are introduced in a sliding movement into two housings, 82 and 83 respectively, formed in the sensor support 21. The latter has a central portion 85 which sets the distance between the two sensors 20 and 22 on the one hand, and which also has a curvature whereby the detection face 86 of the sensor 20 is suitably oriented with respect to the corresponding detection face 87 of the sensor 22.

The sensor support member 21 has, in addition, a column portion 88 projecting downwardly from its lower face. The height H1 of this column portion 88 is predetermined according to the final position in which the wheel 2 or 11 and the sensors 20 and 22 are fitted. The column portion 88 has a lower free end which defines a height H2 that corresponds to the thickness of the printed circuit 5. This lower free end carries two flexible lugs 89 and 90, which are formed with shoulders 91 and 92 respectively, and which together define a foot of the support member 21. This foot is inserted into the hole 73 of the substrate 50, described above with reference to FIG. 6. As the two lugs 89 and 90 are inserted in the hole 73, they are pinched closer together, being released when the shoulders 91 and 92 emerge on the other side of the substrate 50.

Because the hole 73 has an oblong shape (see FIG. 6: in FIG. 7 it is now shown as circular, for simplicity), the sensor support member 21 is fixed as regards its orientation, once it is fitted in the substrate. In addition, during the fitting operation, the fixing lugs of the Hall effect sensors, described earlier herein, are guided naturally through the corresponding contact holes of the substrate 50.

Figure 8:
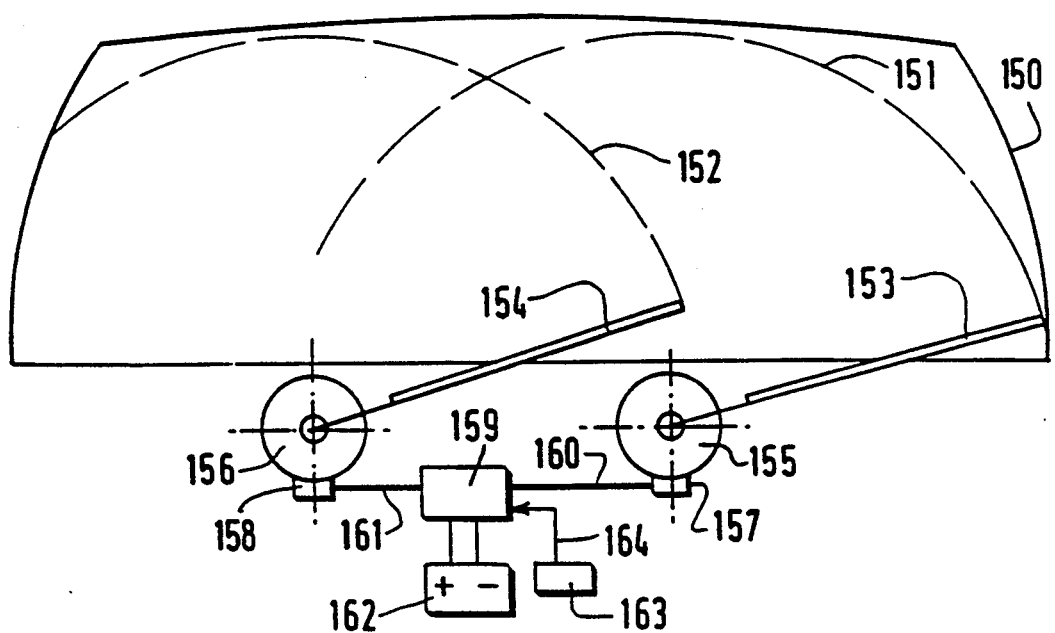
FIG. 8 is a diagram illustrating the principle of a cleaning system which employs a machine according to the invention.

Reference is now made to FIG. 8, which shows one embodiment of a screen wiping system for a motor vehicle. The windshield 150 of the vehicle has two distinct wiping zones 151 and 152. Each zone is swept by a wiper 153 or 154, respectively. Of course, there may be more than two zones provided. This is the case where there is a requirement for wiping certain kinds of complex surface, for example on the windshields of vehicles of large volume, such as heavy goods vehicles. In such cases there are very often more than two wiping zones. Since wiping of the zones 151 and 152 should be synchronised, each wiper 153 or 154 is connected at one end to the motor shaft of a motor 155 or 156 respectively, these motors being automatically synchronised in accordance with the invention. To this end, each of the motors 155, 156 is provided with a connector, 157 and 158 respectively, connected to a control circuit 159 through connecting cables 160 and 161 respectively. The control circuit 159 receives electrical energy from the battery 162 of the vehicle. In addition, it receives wiping command signals from the command unit 163 through a coupling cable 164.

The control circuit receives detection signals from the pair of Hall effect sensors which are installed in each of the motors 155 and 156, via the connecting cables 160 and 161. In response to the signals detecting the angular position of the rotors of the two motors, the control circuit 159 derives an item of information as to position, together with an item of information as to speed, for each of the two motors 155 and 156. These two pairs of items of information enable the wiping operations of the windshield wipers 153 and 154 to be fully synchronised. In this connection, the control circuit 159 regulates the voltage and current which it supplies to each of the motors 155 and 156 through the respective connecting cables 160 and 161. The control circuit is built around a micro-controller, having a memory which contains the synchronisation programme for the wiping operation of the two zones 151 and 152, as a function of the pairs of items of information as to position and speed mentioned above. When the position signal and/or the speed signal from the two motors does not correspond to values memorised in tables of correspondence between the phases of wiping the zones 151 and 152, the micro-controller carries out a routine in which the electrical energy (voltage and/or current) of one or other of the motors, or of both motors, is so modulated as to tend to preserve a predetermined phase relationship.

In the present description, the type of sensor described is of the magnetic Hall effect kind. However other types of sensors, and in particular those that employ optical or electrical effects (for example induction), may be adapted directly for use in the context of the invention.

Similarly, the synchronised wiping system may be adapted so as to drive other mechanical loads than windshield wipers. Regulation of the direction of the headlamps of the vehicle may be mentioned in particular. In addition, automatic synchronisation may be applied to a single electro-dynamic motor or machine. In particular, this is the case when the movements of the mechanical load have to be synchronised with an external effect, such that its variations are for example of a periodic kind and measured by a specific sensor which takes the place of the sensor in the second auto-synchronising means.

Again, in one type of embodiment, the printed circuit 5 described above with reference to FIGS. 1 to 7 may carry one or more integrated circuits, for example a programmable micro-controller and/or a read-only memory in which a programme for generation of the autosynchronisation of the complete system is entered. This programme may be complete, in which case one of the motors is entrusted with the general generating function for the whole system. Such a programme may be dedicated to the generation by the printed circuit in which the programme is entered, of movements of a single mechanical load driven by the motor. In that case, the electrical connecting cable for the motor may include at least one additional transmission wire which serves as the means for transmitting a signal for communication between the micro-controller and the central programme that is entered in the control circuit mentioned above.

What is claimed is:

1. An electro-dynamic machine comprising a stator, a rotor, means mounting the rotor in the stator, a commutator carried by the rotor, automatic synchronising means associated with the rotor and the stator for automatic synchronisation of the machine with another similar machine, wherein the automatic synchronising means includes a wheel coupled to the commutator, said wheel including at least one portion carrying an indication of a recorded angular position of the rotor, and at least one reading device for reading the said indication of position, the reading device being coupled to the stator of the machine.

2. A machine according to claim 1, wherein the portion carrying a recorded indication of angular position is of a magnetic type.

3. A machine according to claim 2, wherein the reading device comprises at least one Hall effect sensor.

4. A machine according to claim 1, further comprising a casing including an intermediate member and an electrical service circuit carried by the intermediate member, the said reading device being mounted on the electrical service circuit of the machine so as to form with it an assembly which is integral with the said intermediate member of the casing.

5. A machine according to claim 1, wherein the said portion carrying a recorded indication of angular position is of an optical type, the reading device comprising at least one optical sensor.

6. A machine according to claim 1, wherein the said wheel is of a multi-polar type comprising a succession of alternate north and south poles disposed at the periphery of the wheel, whereby to produce a reading signal at an output of the reading device representing the instantaneous angular position of the rotor.

7. A machine according to claim 1, wherein the reading device comprises at least two Hall effect sensors and means mounting the said sensors spaced apart by a predetermined angular distance, and further comprising a sensor support defining housings for the said sensors, the latter being mechanically secured in the said housings whereby the sensor support determines the orientation of the sensors with respect to the said wheel and the distance between the reading device and the wheel.

8. A machine according to claim 7, wherein each Hall effect sensor has three electrical terminals, namely a positive terminal, a negative terminal and a detection signal output terminal, the machine further including: a first connecting strip; a second connecting strip; a third connecting strip; a plurality of terminal connecting elements each connected to a respective one of the said first, second and third strips, the said first, second and third strips being connected to the positive, negative and detection signal terminals respectively of each sensor and a plurality of conductive elements associated with the respective said terminal connecting elements so as to constitute therewith a connector, the machine further having a connecting cable for connecting it with an external control circuit, the said cable comprising wires connected to the said connector.

9. A machine according to claim 8, wherein the said electrical service circuit is a printed circuit including a dedicated signal processing circuit connected to those of the said terminal connecting elements that receive the detection signals from the said sensors, whereby the said signals can be processed.

10. A machine according to claim 7, wherein the said electrical service circuit is a printed circuit including power supply connecting means for connecting the machine to an electrical supply source, the said power supply connecting means comprising a first conductive zone and a second conductive zone, the machine further including electrical supply wires attached to the said first and second conductive zones.

11. A synchronised screen wiping apparatus of a motor vehicle having a glass, the apparatus comprising a plurality of motors according to claim 1, and at least one screen wiper associated with each said motor so as to be driven by the latter in movements which are synchronised with each other according to a predetermined wiping pattern.

12. A synchronised screen wiping apparatus according to claim 11, wherein the vehicle has at least two wiping zones to be wiped by a plurality of said wipers synchronised with each other, each wiper having an end, the apparatus further including: a control circuit connected to the motors for synchronising the latter, with the end of each wiper being coupled to the corresponding motor, each motor having a connector and a respective coupling cable connecting the connector to the control circuit; a battery of the vehicle; a command unit of the vehicle; and a further connecting cable connecting the control circuit with the battery and the command unit.

13. Apparatus according to claim 12, wherein the reading device comprises a pair of Hall effect sensors mounted on each motor, the apparatus further including connecting cables connected with the said sensors and the control circuit for transmitting, from the respective sensors to the control circuit, detection signals relating to the angular position of the rotors of the two motors, whereby the control circuit derives data relating to at least one of the parameters comprising position and speed in respect of each motor, so that these data enable the wiping operations of the screen wipers to be substantially perfectly synchronised.

14. Apparatus according to claim 13, including a micro-controller having entered therein a phase law for the wiping operations of the wipers, the control circuit being connected to each motor through a respective coupling cable so as to regulate the voltage and electrical current supplied to the respective motors in accordance with the said phase law.

15. Apparatus according to claim 11, wherein the electrical service circuit of at least one said motor includes a micro-controller for carrying out a programme entered therein, for generating automatic synchronisation which is dedicated to the generation of movements in a single mechanical load driven by the said motor, the micro-controller being arranged in a way selected from the following ways, namely that the micro-controller is arranged to perform a programme entered therein for general generation of the automatic synchronisation of the system, and, the apparatus having at least one means for carrying a signal for communication between the micro-controller and the control circuit, the micro-controller is connected to the said at least one communication signal carrying means.

* * * * *